US011491739B2

(12) United States Patent
Susnjara

(10) Patent No.: US 11,491,739 B2
(45) Date of Patent: *Nov. 8, 2022

(54) METHODS AND APPARATUS FOR COMPENSATING FOR THERMAL EXPANSION DURING ADDITIVE MANUFACTURING

(71) Applicant: Thermwood Corporation, Dale, IN (US)

(72) Inventor: Kenneth J. Susnjara, Dale, IN (US)

(73) Assignee: THERMWOOD CORPORATION, Dale, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/370,296

(22) Filed: Jul. 8, 2021

(65) Prior Publication Data

US 2021/0331460 A1 Oct. 28, 2021

Related U.S. Application Data

(63) Continuation of application No. 17/002,513, filed on Aug. 25, 2020, now Pat. No. 11,072,162, which is a
(Continued)

(51) Int. Cl.
*B29C 69/00* (2006.01)
*B33Y 10/00* (2015.01)
(Continued)

(52) U.S. Cl.
CPC ............ *B29C 69/001* (2013.01); *B26D 5/005* (2013.01); *B29C 33/3842* (2013.01);
(Continued)

(58) Field of Classification Search
None
See application file for complete search history.

(56) References Cited

U.S. PATENT DOCUMENTS 4,989,980 A 2/1991 Berg
7,731,816 B2 6/2010 Oldani et al.
(Continued)

FOREIGN PATENT DOCUMENTS

WO WO 2017/0163405 A1 9/2018

OTHER PUBLICATIONS

International Search Report and Written Opinion for International Application No. PCT/US2018/035330, dated Aug. 29, 2018 (13 pages).

*Primary Examiner* — Yung-Sheng M Tsui
(74) *Attorney, Agent, or Firm* — Bookoff McAndrews, PLLC

(57) ABSTRACT

Embodiments of the present disclosure are drawn to additive manufacturing apparatus and methods. An exemplary additive manufacturing method may include forming a part using additive manufacturing. The method may also include bringing the part to a first temperature, measuring the part along at least three axes at the first temperature, bringing the part to a second temperature, different than the first temperature, and measuring the part along the at least three axes at the second temperature. The method may further include comparing the size of the part at the first and second temperatures to calculate a coefficient of thermal expansion, generating a tool path that compensates for the coefficient of thermal expansion, bringing the part to the first temperature, and trimming the part while the part is at the first temperature using the tool path.

20 Claims, 9 Drawing Sheets

Related U.S. Application Data continuation of application No. 16/572,953, filed on Sep. 17, 2019, now Pat. No. 10,766,244, which is a continuation of application No. 15/804,565, filed on Nov. 6, 2017, now Pat. No. 10,457,036, which is a continuation of application No. 15/636,789, filed on Jun. 29, 2017, now Pat. No. 9,833,986.

(51) Int. Cl.

| | | |
|---|---|---|
| *B33Y 40/00* | (2020.01) | |
| *B29C 64/10* | (2017.01) | |
| *B29C 64/112* | (2017.01) | |
| *B26D 5/00* | (2006.01) | |
| *B29C 33/38* | (2006.01) | |
| *G01B 11/00* | (2006.01) | |
| *B29C 64/118* | (2017.01) | |
| *B29C 64/165* | (2017.01) | |
| *B29C 64/135* | (2017.01) | |
| *B29C 64/188* | (2017.01) | |
| *B29C 64/106* | (2017.01) | |
| *B29C 64/147* | (2017.01) | |
| *B29C 64/153* | (2017.01) | |
| *B29C 64/129* | (2017.01) | |
| *B29C 64/141* | (2017.01) | |
| *B29C 64/124* | (2017.01) | |
| *G01B 5/00* | (2006.01) | |
| *B33Y 80/00* | (2015.01) | |
| *B33Y 50/02* | (2015.01) | |
| *B29C 64/393* | (2017.01) | |
| *B29L 31/00* | (2006.01) | |
| *B29K 105/12* | (2006.01) | |

(52) U.S. Cl.
CPC ............ *B29C 64/10* (2017.08); *B29C 64/106* (2017.08); *B29C 64/112* (2017.08); *B29C 64/118* (2017.08); *B29C 64/124* (2017.08); *B29C 64/129* (2017.08); *B29C 64/135* (2017.08); *B29C 64/141* (2017.08); *B29C 64/147* (2017.08); *B29C 64/153* (2017.08); *B29C 64/165* (2017.08); *B29C 64/188* (2017.08); *B29C 64/393* (2017.08); *B33Y 10/00* (2014.12); *B33Y 40/00* (2014.12); *B33Y 50/02* (2014.12); *B33Y 80/00* (2014.12); *G01B 5/0014* (2013.01); *G01B 11/002* (2013.01); *B29K 2105/12* (2013.01); *B29K 2995/0012* (2013.01); *B29L 2031/757* (2013.01)

(56) References Cited

U.S. PATENT DOCUMENTS

| | | |
|---|---|---|
| 7,810,539 B2 | 10/2010 | Mischler et al. |
| 8,151,854 B2 | 4/2012 | Oldani |
| 8,534,338 B2 | 9/2013 | Oldani et al. |
| 8,954,180 B2 | 2/2015 | Oldani |
| 9,833,986 B1 | 12/2017 | Susnjara |
| 10,457,036 B2 | 10/2019 | Susnjara |
| 2007/0044899 A1 | 3/2007 | Tingley |
| 2008/0006017 A1 | 1/2008 | Rindels |
| 2010/0200168 A1 | 8/2010 | Oldani et al. |
| 2014/0008826 A1 | 1/2014 | Dierkes et al. |
| 2015/0096717 A1* | 4/2015 | Batchelder ............ B29C 64/209 392/465 |
| 2015/0097308 A1* | 4/2015 | Batchelder ............ B29C 64/106 264/40.6 |
| 2015/0331402 A1* | 11/2015 | Lin ........................ H04N 1/603 700/119 |
| 2017/0144370 A1 | 5/2017 | Moore et al. |
| 2017/0165921 A1 | 6/2017 | Fetter et al. |
| 2018/0001553 A1* | 1/2018 | Buller .................... B29C 64/188 |
| 2018/0050502 A1 | 2/2018 | Oldani |
| 2018/0354034 A1* | 12/2018 | Vaes ...................... B33Y 50/02 |
| 2019/0264048 A1* | 8/2019 | Nguyen ................. B33Y 70/00 |

\* cited by examiner

US 11,491,739 B2

METHODS AND APPARATUS FOR COMPENSATING FOR THERMAL EXPANSION DURING ADDITIVE MANUFACTURING

CROSS-REFERENCE TO RELATED APPLICATION(S)

This application is a continuation application of U.S. application Ser. No. 17/002,513, filed Aug. 25, 2021, which is a continuation of U.S. application Ser. No. 16/572,953, filed Sep. 17, 2019, now U.S. Pat. No. 10,766,244, which is a continuation application of U.S. application Ser. No. 15/804,565, filed Nov. 6, 2017, now U.S. Pat. No. 10,457,036, which is a continuation of U.S. application Ser. No. 15/636,789, filed Jun. 29, 2017, now U.S. Pat. No. 9,833,986, the entireties of which are herein incorporated by reference.

TECHNICAL FIELD

Aspects of the present disclosure relate to apparatus and methods for fabricating components (such as, e.g., automobile parts, medical devices, machine components, consumer products, etc.) via additive manufacturing techniques or processes. Such processes include, e.g., three-dimensional (3D) printing manufacturing techniques or processes.

BACKGROUND

Additive manufacturing techniques and processes generally involve the buildup of one or more materials, e.g., layering, to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including, e.g., freeform fabrication, 3D printing, rapid prototyping/tooling, etc. Additive manufacturing techniques may be used to fabricate simple or complex components from a wide variety of materials. For example, a freestanding object may be fabricated from a computer-aided design (CAD) model.

A particular type of additive manufacturing is more commonly known as 3D printing. One such process, commonly referred to as Fused Deposition Modeling (FDM), comprises a process of melting a thin layer of a flowable material (e.g., a thermoplastic material), and applying this material in layers to produce a final part. This is commonly accomplished by passing a continuous, thin filament of thermoplastic material through a heated nozzle, which melts the thermoplastic material and applies the material to the structure being printed, building up the structure. The heated material is applied to the existing structure in thin layers, melting and fusing with the existing material to produce a solid finished product.

The filament used in the aforementioned process is generally produced using a plastic extruder, which may be comprised of a specially designed steel screw rotating inside a heated steel barrel. Thermoplastic material in the form of small pellets is introduced into one end of the rotating screw. Friction from the rotating screw, combined with heat from the barrel, softens the plastic, which may be then forced under pressure through a small opening in a die attached to the front of the extruder barrel. This extrudes a string of material, which may be cooled and coiled up for use in the 3D printer.

Melting a thin filament of material in order to 3D print an item may be a slow process, which may only be suitable for producing relatively small items, or a limited number of items. As a result, the melted filament approach to 3D printing may be too slow for the manufacture of large items, or a larger numbers of items. However, 3D printing using molten thermoplastic materials offers advantages for the manufacture of large items or a large number of items.

A common method of additive manufacturing, or 3D printing, generally includes forming and extruding a bead of flowable material (e.g., molten thermoplastic), applying the bead of material in a strata of layers to form a facsimile of an article, and machining the facsimile to produce an end product. Such a process is generally achieved by means of an extruder mounted on a computer numeric controlled (CNC) machine with controlled motion along at least the x-, y-, and z-axes. In some cases, the flowable material, such as, e.g., molten thermoplastic material, may be infused with a reinforcing material (e.g., strands of fiber or other suitable material or combination of materials) to enhance the material's strength.

The flowable material, while generally hot and pliable, may be deposited upon a substrate (e.g., a mold), pressed down or otherwise flattened to some extent, and/or leveled to a consistent thickness, preferably by means of a compression roller mechanism. The compression roller may be mounted in or on a rotatable carrier, which may be operable to maintain the roller in an orientation tangential, e.g., perpendicular, to the deposited material (e.g., bead or beads of thermoplastic material). The flattening process may aid in fusing a new layer of the flowable material to the previously deposited layer of the flowable material. In some instances, an oscillating plate may be used to flatten the bead of flowable material to a desired thickness, thus effecting fusion to the previously deposited layer of flowable material. The deposition process may be repeated so that successive layers of flowable material are deposited upon an existing layer to build up and manufacture a desired component structure. When executed properly, the new layer of flowable material may be deposited at a temperature sufficient enough to allow the new layer of material to melt and fuse with a previously deposited layer, thus producing a solid part.

In some instances, the process of 3D-printing a part, which may utilize a large print bead to achieve an accurate final size and shape, may involve a two-step process. This two-step process, commonly referred to as near-net-shape, may begin by printing a part to a size slightly larger than needed, then machining, milling, or routing the part to the final size and shape. The additional time required to trim the part to final size may be compensated for by the faster printing process.

One desirable application for large-scale 3D printed parts is in the fabrication of molds and/or tooling, commonly used to manufacture components from thermoset materials, e.g., fiber reinforced epoxy at elevated temperatures in an autoclave. Such components are often desired in the manufacture of aircraft and aerospace products. Traditional methods of fabricating these tools may be lengthy, complex, cumbersome, and/or expensive. Tools made from a reinforced flowable material (e.g., a fiber reinforced thermoplastic material) capable of withstanding any process temperatures required are desirable. Tools manufactured this way may be manufactured faster and at a lower cost. One example of a thermoplastic material suitable for the aforementioned application is polyphenylene sulfide, ("PPS").

PPS, along with numerous other fiber-reinforced thermoplastics, although suitable for a high-temperature operating environment, may exhibit other physical characteristics, which may need to be considered in order to be usable for the aforementioned tools and/or molds. For example, PPS expands in physical size as it is heated and contracts again when cooled. Another characteristic of PPS that may further complicate its use is that material printed using a 3D printer may not expand and contract at the same rate in all directions. During the printing process, the reinforcing fibers may tend to align themselves with a direction of polymer flow, which may result in some reinforcing fibers being aligned along the direction of the printed bead of a flowable material (e.g., printed thermoplastic material). As a result, the printed polymer bead may tend to expand and contract at a slower rate in the direction of the reinforcing fibers and at a faster rate in a direction transverse to the bead length. This may be further complicated by the fact that different methods of printing may result in different fiber orientation within the print bead itself, and different parts may be printed using different patterns and orientations of print bead.

In the practice of the aforementioned additive manufacturing processes, some disadvantages have been encountered. Thermoplastic tools and molds may expand and contract with changes in temperature. However, the amount of expansion and contraction may vary in different directions of a printed bead of material. Owing to variations in the print process and variations in the fiber orientation of the print bead(s), it may be difficult to predict the amount of expansion and contraction of a particular printed part (e.g., a tool or a mold) when exposed to temperature variations.

SUMMARY

Aspects of the present disclosure relate to, among other things, methods and apparatus for fabricating components via additive manufacturing, such as, e.g., 3D printing techniques. Each of the aspects disclosed herein may include one or more of the features described in connection with any of the other disclosed aspects.

An object of the present invention is to establish a process by which 3D printed parts (e.g., tools and/or molds) may be fabricated using a near net shape additive manufacturing process so that when heated to a specific process temperature, the 3D printed parts may expand to a correct size and/or shape. To accomplish this, first, the rate of thermal expansion of the part (e.g., a tool or a mold) may be determined in each direction. Second, the thermal expansion information may be used to modify the original CNC trimming program, which may then be used to trim the tool and/or mold a second time. In doing so, the size and shape of the resulting part may be reduced in one or more directions by an amount appropriate to allow for thermal expansion.

In one aspect of the disclosure, the process begins by 3D printing the required tool or mold and subsequently machining and trimming the tool or mold to the specified size at room temperature. A touch probe may be mounted to the subtractive (or trimming) gantry, for example, to the trim spindle of the gantry. The touch probe may have an accuracy in the range of, e.g., 0.001" or less. While at room temperature, a CNC program may be executed to touch the touch probe to the printed part to determine the size of the part at several locations, e.g., along each of three perpendicular axes. Once the size of the part at the various points is measured, the information may be stored in the control memory of the CNC machine.

In a next step, the machined tool or mold may be heated to the proper process temperature at which the tool or mold is intended to be heated to during use. The process temperature may range from 200 degrees to 450 degrees Fahrenheit. The tool or mold may be returned to the machine (or alternatively the tool or mold may have been heated while remaining in the machine), where the machined tool or mold is again measured, for example, using the same measurement CNC program used previously. Measurements may again be taken, e.g., along each of the three perpendicular axes, and the additional measurement information may be stored in the control memory.

Based on the measurements, the amount that the part expands per unit of measure with a specific rise in temperature can be calculated, for example, in units of expansion per inch per degree Fahrenheit. This number is commonly referred to as the Coefficient of Thermal Expansion ("CTE"). Due to variations in the expansion of the print bead due to fiber orientation and the variable pattern of the print bead in a particular part, it is normal for the CTE number to be different along different perpendicular axes of a part.

To compensate for thermal expansion, the part may be re-sized and/or re-shaped to account for any thermal expansion that may occur when the part is heated to a process temperature during use. To adjust the shape and/or size of the part to account for thermal expansion, the part may first be aligned with the axes of the machine, and the CTE of the part may be determined along each axis of motion of the machine. In a next step, the motion of the machine may be adjusted so that when the CNC program is executed, the motion of each axis of the machine is adjusted to accommodate the thermal expansion. Accordingly, instead of moving the distance instructed by the original CNC program (as may have occurred when the part was initially trimmed), the movement of the machine along each increment of motion is adjusted to adapt for the CTE along that axis of motion. This compensates for the temperature rise from the ambient temperature at which the part is machined, to the process temperature at which it will be used. For example, tools or molds may be machined so that when the tools or the molds are used, their thermal expansion may be accounted for. In this way, the original part CNC program may be used, and the CNC machine control may make adjustments to the part size/shape to allow for thermal expansion.

An advantage of this type of modification process is if the ambient temperature at which the part is ultimately machined is different than the machining temperature that was expected when the tool path for the part was programmed, it may not be necessary to reprogram the part for the actual machining temperature. Moreover, the printing and/or trimming process may extend over a longer period of time, during which the ambient temperature of the room and the temperature of the part being machined may change. By utilizing the above-identified approach, the CNC machine control may continuously and/or periodically monitor the temperature of the room and the temperature of the part being machined, and may continuously or periodically adjust the amount by which the machine compensates along each axis based on current temperatures.

In one aspect of the disclosure, the CNC machine control may compensate for temperature variations as described above in several ways. For example, one way may include adjusting the scaling for each axis, which may define how much machine motion is generated for a specific rotation of the servo drive. By adjusting the scaling, the machine may move a different amount for each rotation of the drive than it normally would (e.g., it may move more or less) to adjust the overall motion of the machine and provide compensation for expansion. In another example, a specific calculated distance for each increment of programmed motion may be added or subtracted along each axis. In an exemplary embodiment, a software compensation table may be created, which may define the position of each axis desired for each programmed position along that axis. Indeed, a number of different methods or combinations of methods may be used to adjust the motion of the machine to compensate for CTE. Regardless of which method may be selected, the control may execute the CNC trimming program a second time so that when heated to the process temperature, the part is the correct shape and size.

In another aspect of the disclosure, scanning technology may be used to measure the size of the part at room temperature and at the process temperature. For example, the process may begin by 3D printing the required tool or mold and subsequently machining and trimming the tool or mold to the specified size at room temperature. While at room temperature, one or more surfaces of the part may be scanned with surface scanning technology, such as a laser scanner or ultrasound scanner, to generate a software representation of the part's surface. The software representation may be stored as computer data. In some embodiments, a computer design surface or solid representation of the part may be used. The computer design surface or solid representation may correspond to surface(s), and/or dimensions, of a hypothetical desired part using computer-aided design software. In a next step, the machined tool or mold may be heated to the proper process temperature at which the tool or mold is intended to be heated to during use. One or more surfaces of the part may then be re-scanned while the part is at the process temperature, another software representation or a computer design surface may be generated, and this additional information may be stored.

Computer software may then be used to determine the distance that points on the tool surface expanded or moved in a direction perpendicular to the surface. Based on this information, the software may then be used to create a tool surface that is the same perpendicular distance from the initial surface at the various points, but in the opposite direction. This generates a software surface that is a shrunken version of the original tool surface by an amount equal to the amount that the tool expanded at the various points when heated to its process temperature. This new, shrunken, software surface is then used to generate a CNC tool path that will then be used to machine the part to a size and shape that will expand to the required dimensions when heated to the process temperature.

Embodiments of the present disclosure may be drawn to additive manufacturing methods. An additive manufacturing method may include forming a part using additive manufacturing and then bringing the part to a first temperature. The method may also include measuring the part along at least three axes while the part is at the first temperature to determine a size of the part at the first temperature along the at least three axes. The method may then include bringing the part to a second temperature, different than the first temperature, and measuring the part along the at least three axes while the part is at the second temperature to determine a size of the part at the second temperature along the at least three axes. The method may further include comparing the size of the part at the first temperature and the size of the part at the second temperature along the at least three axes to calculate a coefficient of thermal expansion per a unit of measure per a unit of temperature change. The method may then include generating a tool path that compensates for the coefficient of thermal expansion, bringing the part to the first temperature, and trimming the part while the part is at the first temperature using the tool path that compensates for the coefficient of thermal expansion.

In another embodiment of the present disclosure, an additive manufacturing method may include printing a part using a three-dimensional printer, and bringing the part to a first temperature. The method may also include measuring the part along a plurality of axes while the part is at the first temperature to determine a size of the part at the first temperature using a surface scanner or a touch probe, and transmitting measurement data from the surface scanner or the touch probe to a controller. The method may then include heating the part to a second temperature, greater than the first temperature, and measuring the part along the plurality of axes while the part is at the second temperature to determine a size of the part at the second temperature using the surface scanner or the touch probe. The method may then include transmitting measurement data from the surface scanner or the touch probe to the controller, and comparing the size of the part at the first temperature and the size of the part at the second temperature and calculating a coefficient of thermal expansion per a unit of measure per a unit of temperature change using the controller. The method may further include generating a tool path that compensates for the coefficient of thermal expansion, bringing the part to the first temperature, and trimming the part while the part is at the first temperature using the tool path that compensates for the coefficient of thermal expansion.

In another embodiment of the present disclosure, an additive manufacturing method may include forming a part using a computer numeric controlled machine, cooling the part to a room temperature, and trimming the part while the part is at the room temperature. The method may also include measuring the part, once trimmed, while the part is at the room temperature to determine a size of the part at the room temperature along a plurality of axes. The method may then include heating the part to a second temperature, higher than the first temperature, and measuring the part while the part is at the second temperature to determine a size of the part at the second temperature along the plurality of axes. The method may further include comparing the size of the part at the first temperature and the size of the part at the second temperature along the plurality of axes to calculate a coefficient of thermal expansion per a unit of measure per a unit of temperature change, and generating a tool path that compensates for the coefficient of thermal expansion. The method may next include cooling the part to the room temperature, and trimming the cooled part using the tool path that compensates for the coefficient of thermal expansion.

As used herein, the terms "comprises," "comprising," or any other variation thereof, are intended to cover a non-exclusive inclusion, such as a process, method, article, or apparatus. The term "exemplary" is used in the sense of "example," rather than "ideal."

It may be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating components via additive manufacturing or 3D printing techniques. More particularly, the methods and apparatus described herein comprise a method for fabricating printed parts (e.g., tools, molds, etc.) using a near net shape additive manufacturing process so that when the printed part is heated to a specific process temperature, the part may expand to a correct size and shape.

For purposes of brevity, the methods and apparatus described herein will be discussed in connection with the fabrication of parts using thermoplastic materials. However, those of ordinary skill in the art will readily recognize that the disclosed apparatus and methods may be used with any flowable material suitable for additive manufacturing, such as, e.g., 3D printing.

Figure 1:
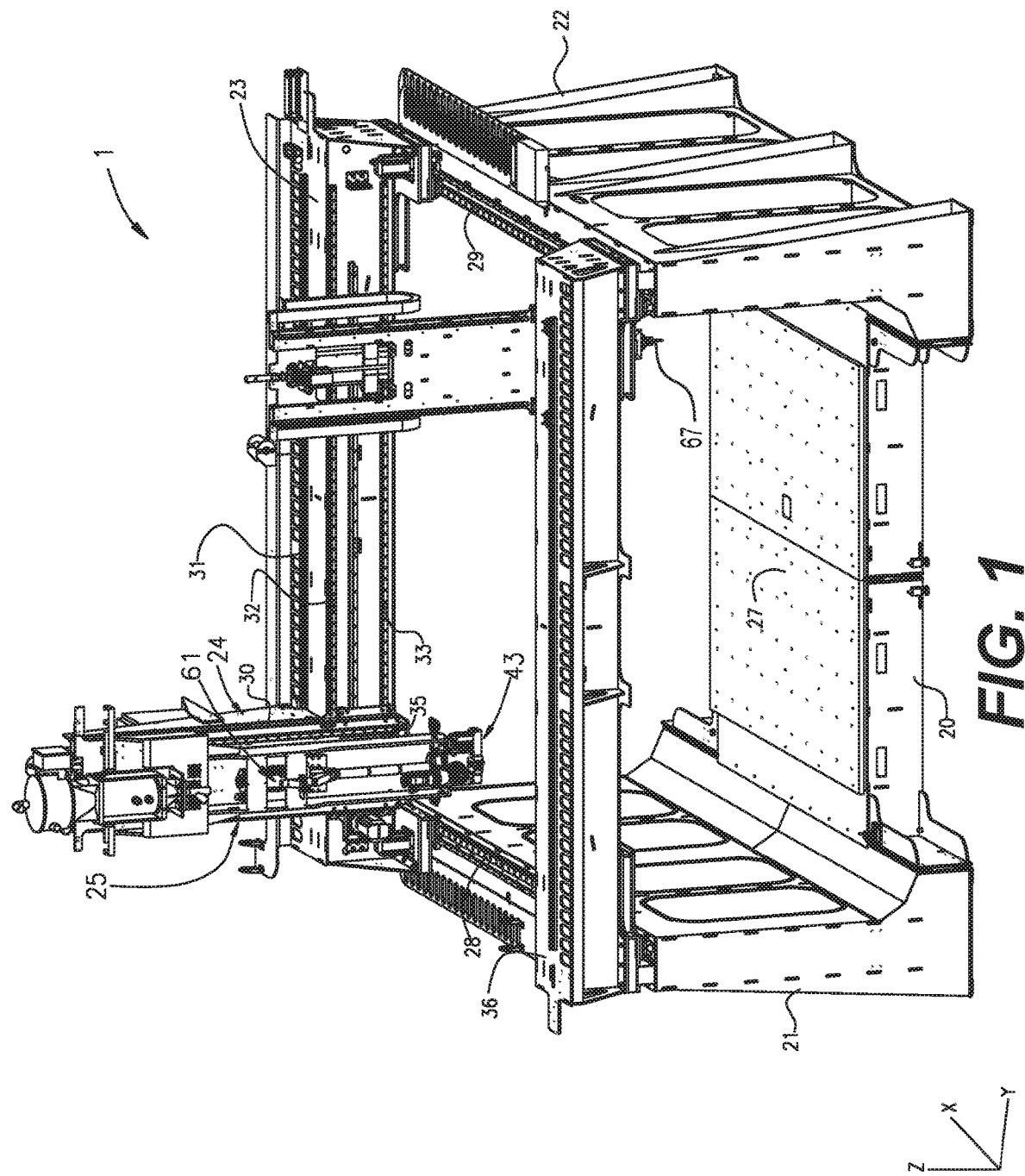
FIG. 1 is a perspective view of an exemplary CNC machine operable pursuant to an additive manufacturing process in forming articles, according to an aspect of the present disclosure.

With reference now to FIG. 1, there is illustrated a CNC machine 1 embodying aspects of the present disclosure. A control/controller (not shown) may be operatively connected to CNC machine 1 for displacing an application nozzle 51 along a longitudinal line of travel (x-axis), a transverse line of travel (y-axis), and a vertical line of travel (z-axis), in accordance with a program inputted or loaded into the controller for performing an additive manufacturing process to form a desired component. CNC machine 1 may be configured to print or otherwise build 3D parts from digital representations of the 3D parts (e.g., AMF and STL format files) programmed or loaded into the controller.

For example, in an extrusion-based additive manufacturing system, a 3D part may be printed from a digital representation of the 3D part in a layer-by-layer manner by extruding a flowable material. The flowable material may be extruded through an extrusion tip or nozzle 51 carried by a print head or an applicator head 43 of the system. The flowable material may be deposited as a sequence of beads or layers on a substrate in an x-y plane. The extruded, flowable material may fuse to previously deposited material and may solidify upon a drop in temperature. The position of the print head relative to the substrate may then be incrementally advanced along a z-axis (perpendicular to the x-y plane), and the process may then be repeated to form a 3D part resembling the digital representation.

CNC machine 1, shown in FIG. 1, includes a bed 20 provided with a pair of transversely spaced side walls 21 and 22, a printing gantry 23, and a trimming gantry 36 supported on one or more of side walls 21 and 22. CNC machine 1 also includes a carriage 24 mounted on printing gantry 23, a carrier 25 mounted on carriage 24, an extruder 61, and an applicator assembly 43 mounted on carrier 25. Located on bed 20 between side walls 21 and 22 is a worktable 27 provided with a support surface. Worktable 27 may be horizontal. The support surface may be disposed in an x-y plane and may be fixed or displaceable along an x-axis or a y-axis. In an example, displacement of worktable 27 may be achieved using one or more servomotors and one or more of rails 28 and 29 mounted on bed 20 and operatively connected to worktable 27. Printing gantry 23 and trimming gantry 36 are disposed along a y-axis, supported on side walls 21 and 22. Printing gantry 23 and trimming gantry 36 may be mounted on a set of guide rails 28, 29, which are located along a top surface of side walls 21 and 22. Both printing gantry 23 and trimming gantry 36 may either be fixedly or displaceably mounted, and, in some aspects, printing gantry 23 and trimming gantry 36 may be displaced along the x-axis. In an exemplary displaceable version, one or more servomotors may control movement of printing gantry 23 and/or trimming gantry 36. For example, one or more servomotors may be mounted on printing gantry 23 and/or trimming gantry 36 and operatively connected to tracks, e.g., guide rails 28, 29, provided on side walls 21 and 22 of bed 20.

Carriage 24 may be supported on printing gantry 23 and may be provided with a support member 30 mounted on and displaceable along one or more guide rails 31, 32, and 33 provided on the printing gantry 23. Carriage 24 may be displaceable along a y-axis on one or more guide rails 31, 32, and 33 by a servomotor mounted on printing gantry 23 and operatively connected to support member 30. Carrier 25 is mounted on one or more vertically disposed guide rails 35 supported on carriage 24 for displacement of carrier 25 relative to carriage 24 along a z-axis. Carrier 25 may be displaceable along a z-axis by one or more servomotors mounted on carriage 24 and operatively connected to carrier 25.

Figure 2:
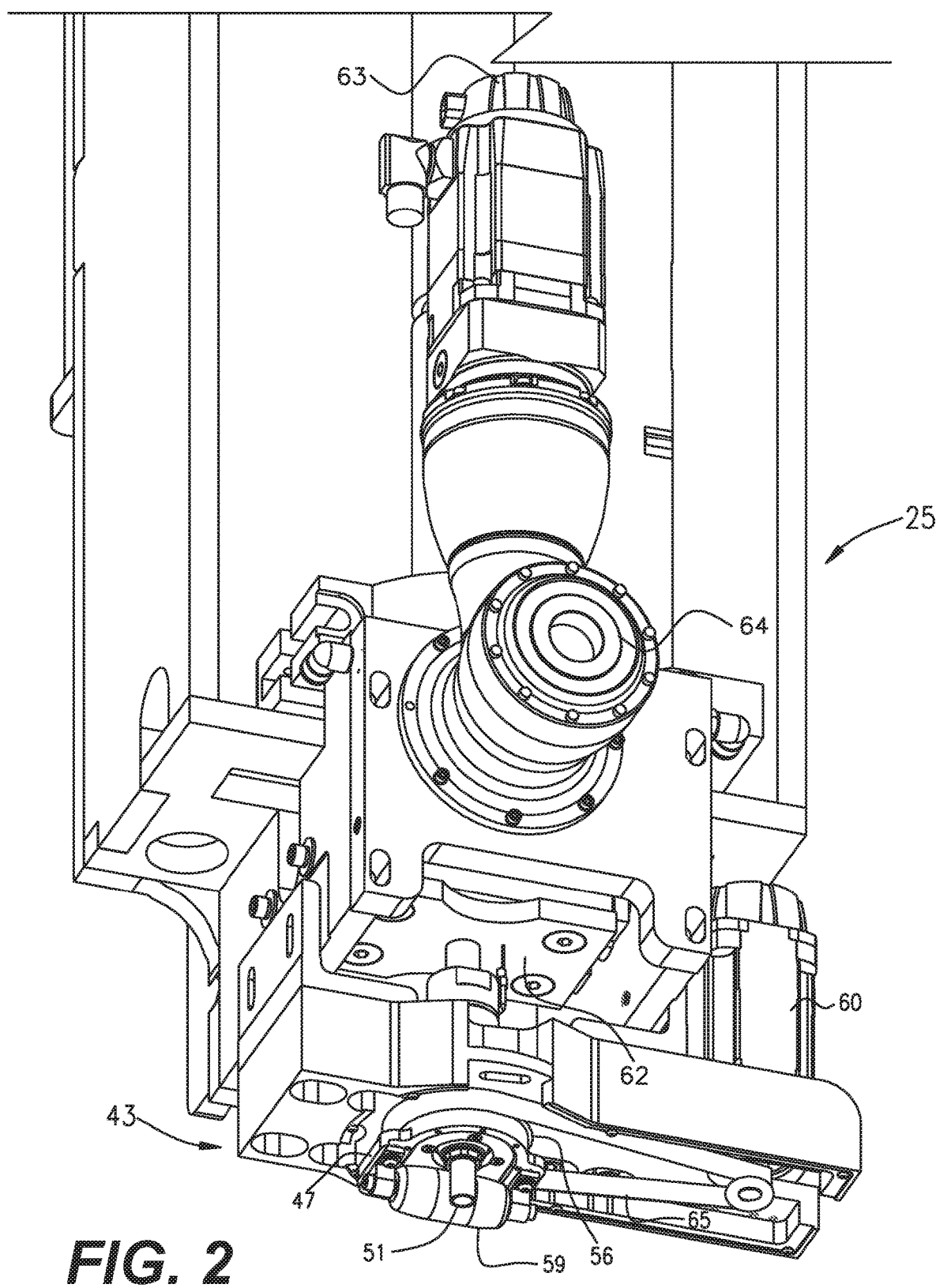
FIG. 2 is an enlarged perspective view of an exemplary carrier and applicator assembly of the exemplary CNC machine shown in FIG. 1.
Figure 3A:
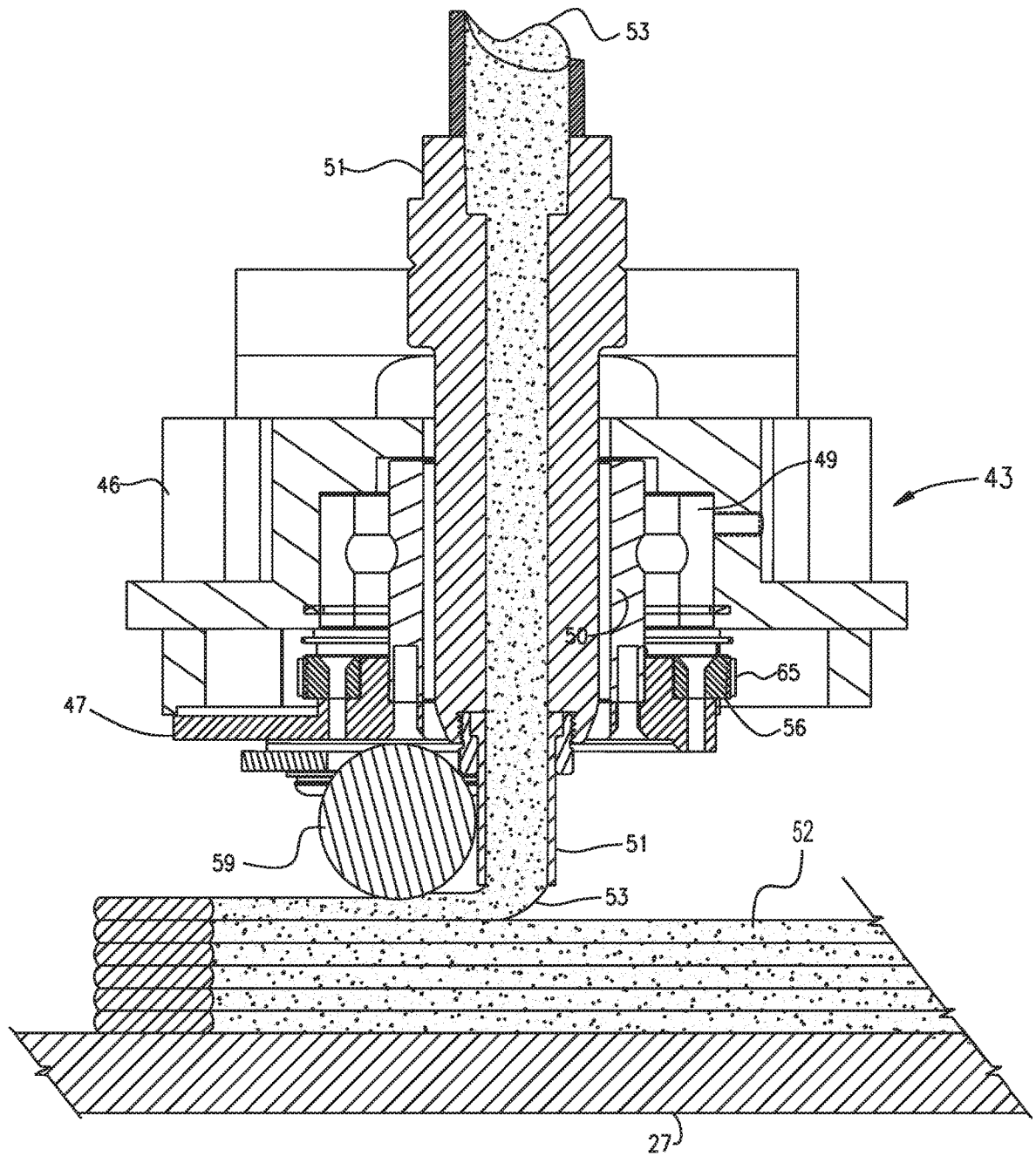
FIG. 3A is an enlarged cross-sectional view of an exemplary applicator head assembly shown in FIG. 2, during use.

As best shown in FIG. 2, mounted to carrier 25 is a positive displacement gear pump 62, which may be driven by a servomotor 63 through a gearbox 64. Gear pump 62 receives molten plastic from extruder 61, shown in FIG. 1. A compression roller 59 (e.g., bead shaping roller) for compressing material may be mounted on carrier bracket 47. Compression roller 59 may be moveably mounted on carrier bracket 47, for example, rotatably or pivotably mounted. Compression roller 59 may be mounted relative to nozzle 51 so that material, e.g., one or more beads of flowable material (such as thermoplastic resin), discharged from nozzle 51 is smoothed, flattened, leveled, and/or compressed by compression roller 59, as depicted in FIG. 3A. One or more servomotors 60 may be configured to move, e.g., rotationally or pivotably displace, carrier bracket 47 via a pulley 56 and belt 65 arrangement. In some examples, carrier bracket 47 may be rotationally or pivotably displaced via a sprocket and drive-chain arrangement.

With reference to FIG. 3A, applicator head 43 may include a housing 46 with a roller bearing 49 mounted therein. Carrier bracket 47 may be mounted, e.g., fixedly mounted, to an adaptor sleeve 50, journaled in bearing 49. As shown in FIG. 3A, a bead of a flowable material 53 (e.g., a thermoplastic material) under pressure from a source disposed on carrier 25 (e.g. gear pump) or another source (e.g., one or more extruder 61 (FIG. 1) and an associated polymer or gear pump) disposed on carrier 25 may be flowed to applicator head 43, which may be fixedly (or removably) connected to, and in communication with, nozzle 51. In use, flowable material 53 (e.g., thermoplastic material) may be heated sufficiently to form a molten bead thereof, and may be extruded through nozzle 51 to form multiple rows of deposited material 52 onto a surface of worktable 27. In some embodiments, flowable material 53 may include a suitable reinforcing material, such as, e.g., fibers, that facilitate and enhance the fusion of adjacent layers of extruded flowable material 53. In some aspects, flowable material 53 delivered onto a surface of worktable 27 may be free of trapped air, the rows of deposited material may be uniform, and/or the deposited material may be smooth. For example, flowable material 53 may be flattened, leveled, and/or fused to adjoining layers by any suitable means (e.g., compression roller 59), to form an article.

Although compression roller 59 is depicted as being integral with applicator head 43, compression roller 59 may be separate and discrete from applicator head 43. In some embodiments, compression roller 59 may be removably mounted to machine 1. For example, different sized or shaped compression rollers 59 may be interchangeably mounted on machine 1, depending, e.g., on the type of flowable material 53 and/or desired characteristics of the rows of deposited flowable to be formed on worktable 27.

In an example, machine 1 may also include a velocimetry assembly (or multiple velocimetry assemblies) configured to determine flow rates (e.g., velocities and/or volumetric flow rates) of deposited flowable material 53 being delivered from applicator head 43. The velocimetry assembly may transmit signals relating to the determined flow rates to the aforementioned controller coupled to machine 1, which then may utilize the received information to compensate for variations in the material flow rates.

In the course of fabricating a component, pursuant to the methods described herein, the control system of machine 1, in executing the inputted program, may operate the several servomotors as described to displace printing gantry 23 and trimming gantry 36 along the x-axis, displace carriage 24 along the y-axis, displace carrier 25 along the z-axis, and/or rotate carrier bracket 47 about the z-axis while nozzle 51 deposits flowable material 53 and compression roller 59 compresses the deposited material, as shown in FIG. 3A.

Figure 3B:
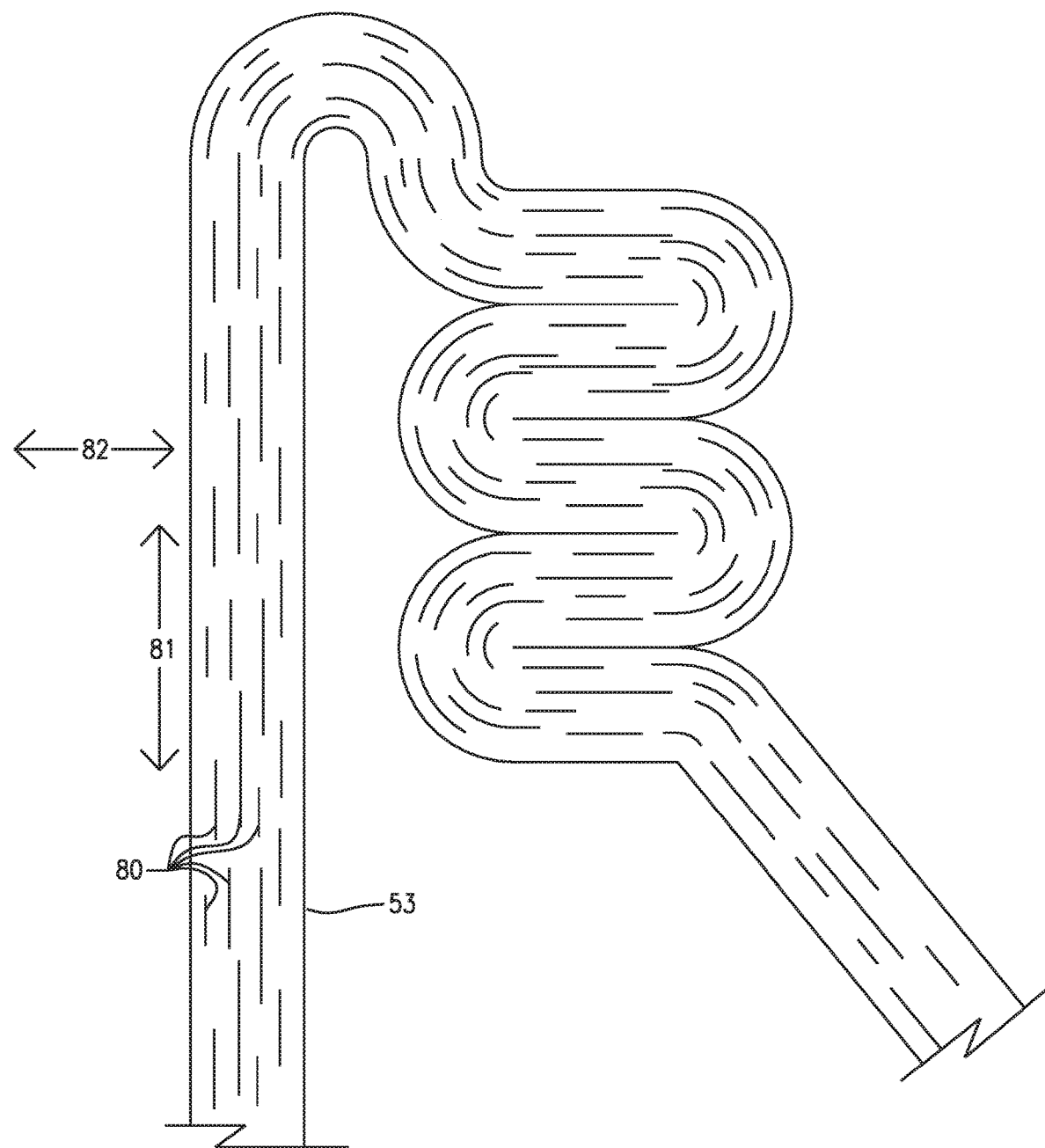
FIG. 3B is a top view of an exemplary layer of flowable material containing reinforcing fibers.

FIG. 3B shows a top view of an exemplary irregularly shaped layer of deposited flowable material 53 containing reinforcing fibers 80. During operation of machine 1 (i.e., during the printing process), reinforcing fibers 80 may align themselves along a direction of flow as material is deposited by nozzle 51. This generally results in reinforcing fibers aligned along the direction of the deposition of flowable material. For example, on the left side of FIG. 3B, flowable material was deposited by nozzle 51 in a direction 81. Accordingly, reinforcing fibers 80 are also aligned along direction 81. On the right side of FIG. 3B, flowable material was deposited in a serpentine shape. Accordingly, reinforcing fibers 80 are aligned in a serpentine shape, curving back and forth between a direction 82 and direction 81, which are perpendicular to one another.

As a result of the different orientations of reinforcing fiber alignment, a bead of deposited flowable material 53 may tend to expand and contract at a slower or faster rate in different directions. For example, once hardened, flowable material 53 may expand and contract at a slower rate in the direction in which reinforcing fibers 80 are oriented. Using the left side of FIG. 3B as an example, hardened flowable material 53 may expand and contract more slowly in direction 81 and may expand and contract at a faster rate in direction 82, transverse to the orientation of reinforcing fibers 80 (i.e., direction 81). Although this straightforward example is used for simplicity, it is acknowledged that different methods of deposition (e.g., 3D printing) may also result in different fiber orientations within the deposited flowable material 53. Accordingly, the type of 3D printing used and the direction of deposition may both affect the orientation of reinforcement fibers. Additionally, some parts made using additive manufacturing may also utilize different deposition patterns and/or orientations of a bead of deposited flowable material 53, which may result in further irregularity in the alignment of reinforcing fibers 80 in the hardened, formed part.

Figure 4A:
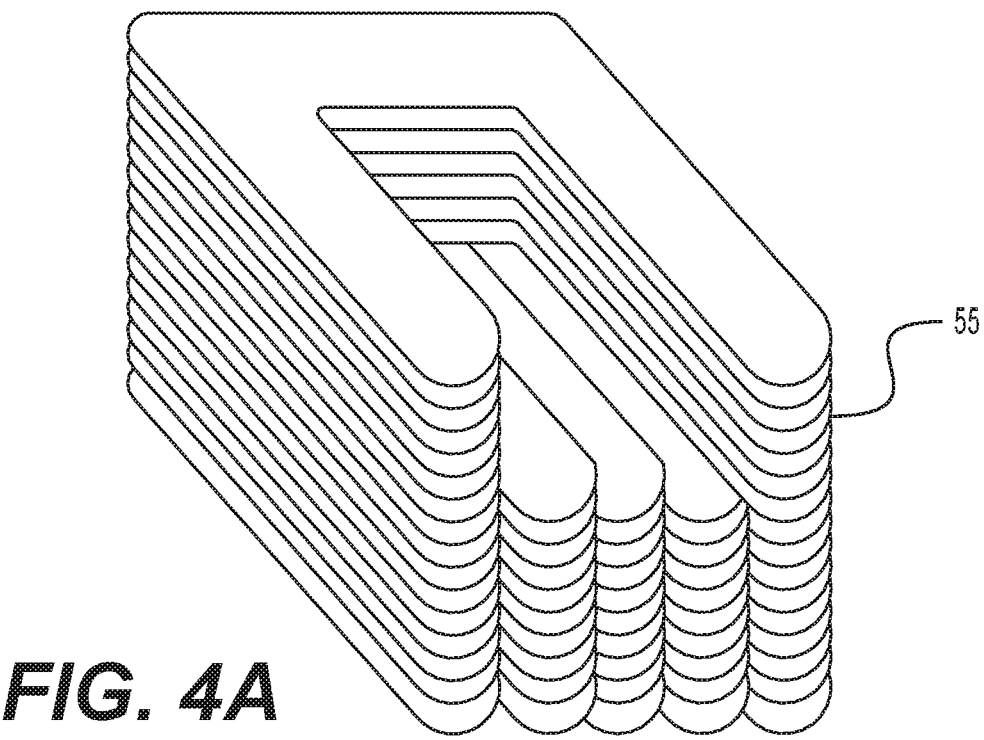
FIG. 4A is a perspective view of an exemplary part formed by additive manufacturing.

During operation of machine 1 to form a part, the deposition process may be repeated so that each successive layer of flowable material 53 may be deposited upon an existing layer to build up and manufacture a desired printed part 55, as shown in FIG. 4A. Part 55 may be comprised of multiple rows of deposited flowable material laid successively on a surface of worktable 27, as described and shown in FIG. 3A. In some embodiments, printed part 55 may be allowed to cool down for a predetermined period of time (e.g., several minutes to several hours, depending, e.g., on the type of thermoplastic material used) to reach room temperature before any machining and/or trimming operations commence.

Figure 4B:
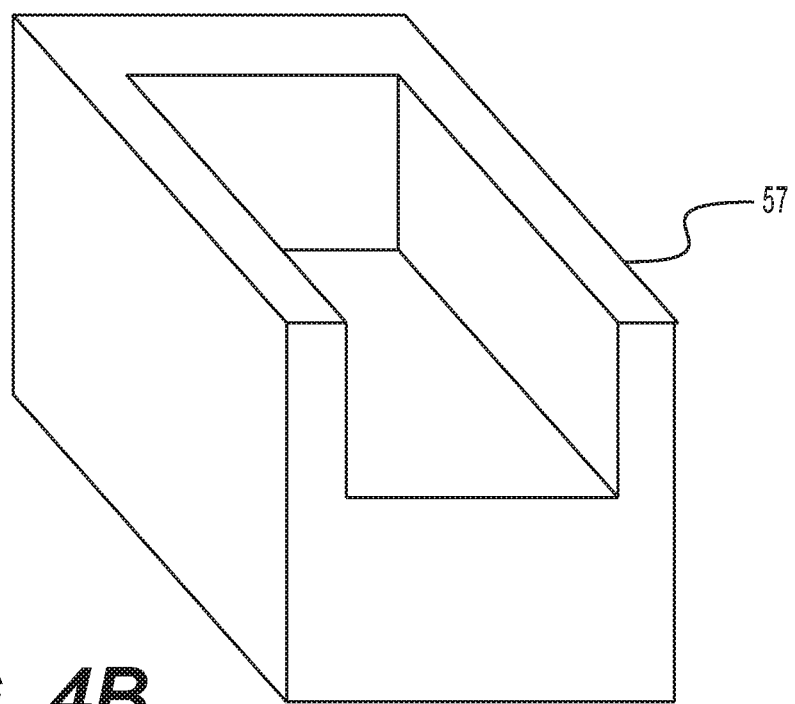
FIG. 4B is a perspective view of the exemplary part in FIG. 4A, trimmed to a desired shape and size.

Once part 55 has cooled to room temperature, trimming gantry 36 may be used with an attached router to machine and/or trim printed part 55 to a final net shape 57, as shown in FIG. 4B. Initially, a first pass (e.g., roughing pass) may be performed by trimming gantry 36 with the attached router to remove a first portion of material (e.g., a first roughing pass to remove most excess material). Subsequently, a second pass may be performed, if necessary, by trimming gantry 36 to produce a smooth surface on final net shape part 57, as shown in FIG. 4B. In some examples, additional passes may be executed by trimming gantry 36 if the net shape of final part 57 is not of a desirable shape, size, smoothness, or other suitable property. In other aspects, a single pass may be used to form the net shape of final part 57.

Figure 5:
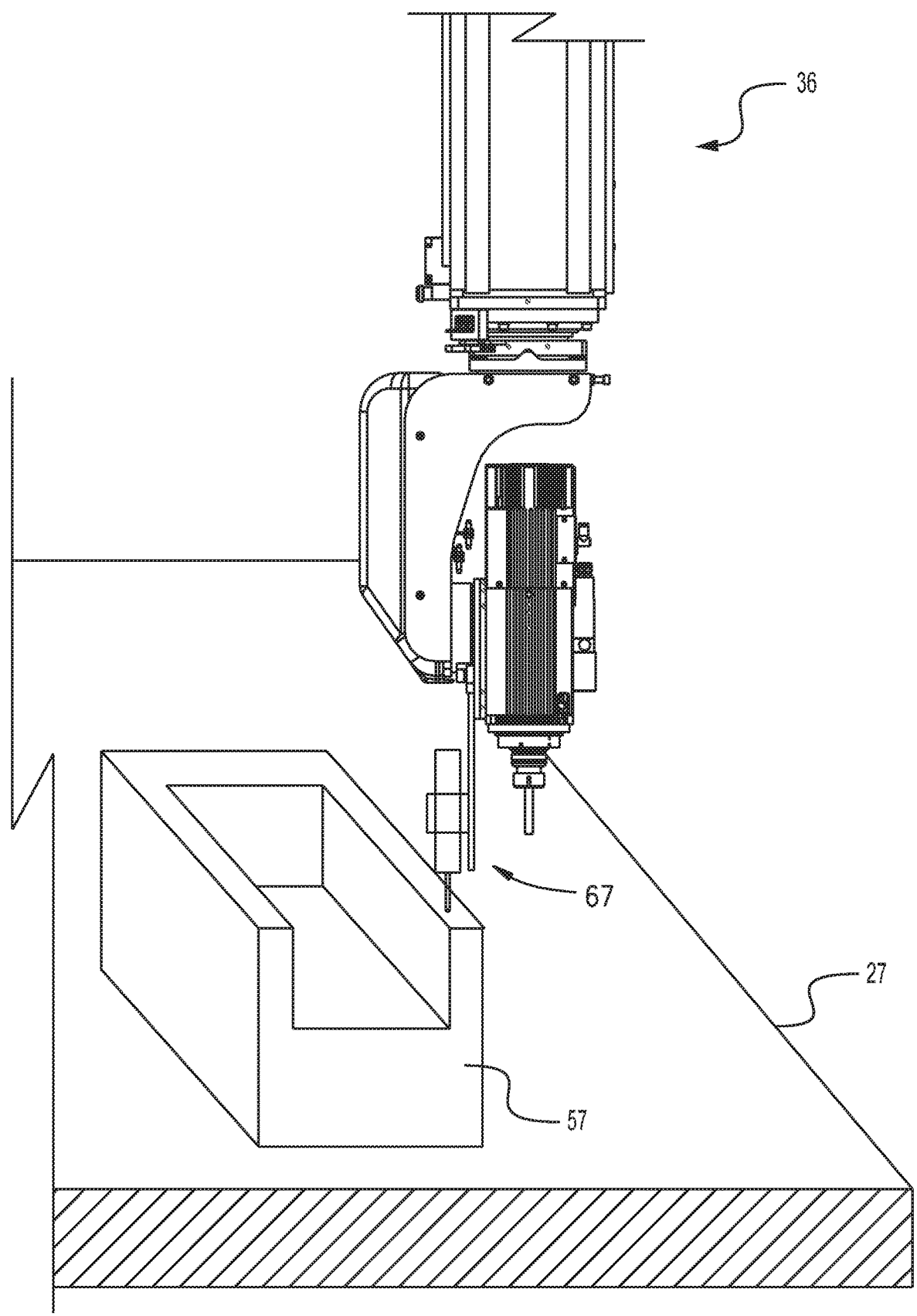
FIG. 5 is a perspective view of the exemplary trimmed part in FIG. 4B being measured by an exemplary probing technology attached to an exemplary trimming gantry.

When final net shape part 57 is completed on worktable 27, in a next step, a touch probe 67 may be attached to trimming gantry 36, as shown in FIG. 5. Touch probe 67 may be attached to a spindle of machine 1 (e.g., a spindle of trimming gantry 36) in such a manner that the control of machine 1 may know the precise position of a tip of the touch probe with respect to a position of machine 1. Machine 1 may then move towards a part to be measured. In an exemplary embodiment, touch probe 67 may include a highly accurate switch that may trip when touch probe 67 comes in contact with part 57. When the switch of touch probe 67 trips, the control of machine 1 may note the exact position of the tip of touch probe 67 in order to provide an accurate measurement of part 57. In some examples, touch probe 67 may be highly accurate and may have a measurement accuracy of 0.001" to 0.0001" to obtain highly accurate measurements of final net shape part 57. In an exemplary embodiment, touch probe 67 may be configured to create a plurality of measurement points on part 57, under the control, e.g., of a CNC program. The CNC program may be programmed in advance of any machining, trimming, or other post-printing process steps, or during or after such steps. In some aspects, the measurement points obtained using touch probe 67 may be controlled manually rather than by a CNC program.

Figure 6:
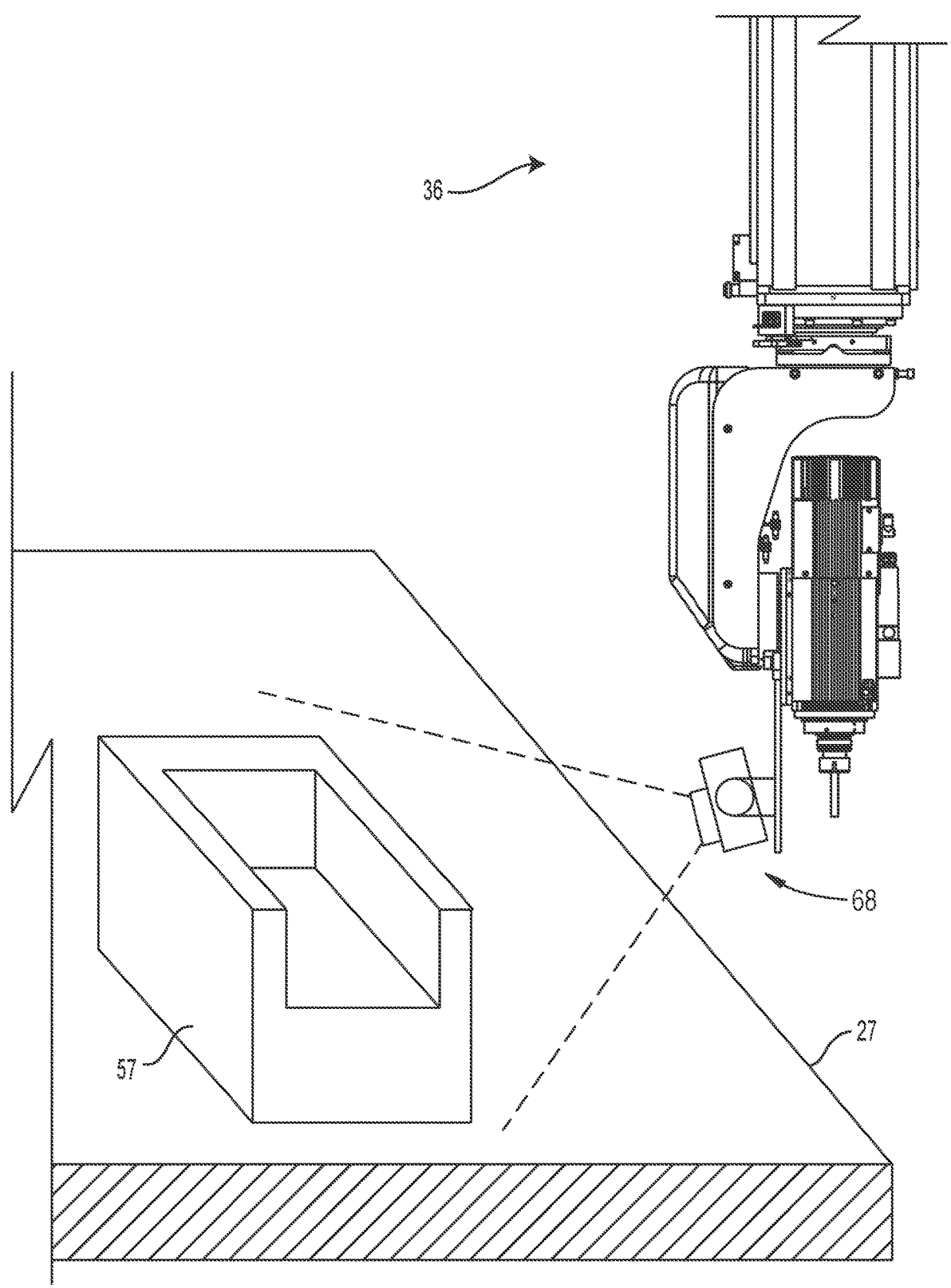
FIG. 6 is a perspective view of the exemplary trimmed part in FIG. 4B being measured by an exemplary scanning technology attached to an exemplary trimming gantry.

Alternatively, in another exemplary embodiment, when final net shape part 57 is completed on worktable 27, a surface scanner 68 may be attached to trimming gantry 36, as shown in FIG. 6. Surface scanner 68 may be used to create a three-dimensional (3D) surface scan of final part 57. During operation, trimming gantry 36 may move around part 57 to create a complete 3D image of part 57. For example, trimming gantry 36 and surface scanner 68 may move 360 degrees around part 57 and may make one or more revolutions around part 57. Trimming gantry 37 and surface scanner 68 may also move over the top of part 57. In some examples, surface scanner 68 may be highly accurate and may be configured to obtain highly accurate measurements of final net shape part 57. For example, in some embodiments, surface scanner 68 may obtain measurements from 0.002" to 0.0001". In an exemplary embodiment, similarly to touch probe 67, surface scanner may be used to create a number of measurement points on part 57 as trimming gantry 37 moves under the control of a CNC program. In some embodiments, surface scanner 68 may be used to generate a 3D rendition of part 57 that reflects these measurements using suitable software. The CNC program used to move surface scanner 68 may be programmed in advance of any machining, trimming, or other post-printing process steps, or during or after such steps. In some aspects, the measurement points obtained using surface scanner 68 may be controlled manually rather than by a CNC program.

Any suitable surface scanning technology may be used to measure part 57. For example, ultrasonic or ultrasound scanning may be used to detect part 57 and measure distances, or laser scanning technology may be used. In an exemplary embodiment, surface scanner 68 may not be attached to trimming gantry 37 and may instead be a hand-held scanner that may be used by an operator to create a 3D image of final part 57.

During operation of machine 1, trimming gantry 36 may move around part 57, and/or may move over one or more surfaces of part 57, to create a matrix of data, e.g., size data, about part 57 in an initial data collection step. Measurements of part 57 may then be taken again in a subsequent measurement step, once part 57 has been heated up to a second, process temperature, warmer than the temperature of part 57 during the initial measuring step. In exemplary embodiments, the initial temperature of part 57 may be in the range of, e.g., 60 degrees to 100 degrees Fahrenheit, and the process temperature may be in the range of, e.g., 200 degrees to 450 degrees Fahrenheit.

In some embodiments, measurements may first be taken at the initial process temperature, and then part 57 may be cooled to a second, lower, temperature for taking a second set of measurements. In some aspects, part 57 may be measured at more than two different temperatures.

At a next step, the control of machine 1 may then compare the two (or more) sets of measurement data and may use the comparison data to generate a new tool path. Suitable software may be stored in the control of machine 1 to perform the steps disclosed herein. The control of machine 1 may perform this function by subtracting the initial measurements at each measurement point taken when part 57 was at a cooler temperature from measurements taken at each measurement point when part 57 was then heated to a process temperature to determine the amount of expansion at each measurement point. This expansion amount may then be divided by the initial size measurement at each measurement point to calculate the expansion per unit of measure, for example, the expansion per inch. This expansion per unit of measure may then be divided by the number of units of temperature difference between the room temperature at which the initial measurements were taken and the elevated, process temperature at which the second set of measurements were taken (or vice versa, if the elevated temperature measurements were taken first). The result of these calculations is the rate of expansion per unit of measure per unit of temperature change, for example, expansion per inch per degree Fahrenheit. This may be referred to as the Coefficient of Thermal Expansion ("CTE"). In some aspects, to determine an average CTE of a part (e.g., tool or mold) in each of the three mutually perpendicular directions, the CTE number for each measurement along each axis may be averaged.

The CTE of each axis, along with the temperature at which the part (e.g., tool or mold) may be used, may be stored in the machine CNC control, for example, in a memory of the control. The CNC control may then be instructed to run a second trimming program taking into account the above CTE information. There are multiple techniques by which this can be accomplished by the machine CNC control. One technique may include having a scaling factor on the machine that defines the amount of machine motion in each axis that results from rotation of the servo drive motor for that axis. This scaling factor may be adjusted so that the actual machine motion is increased or decreased to account for the CTE of the part along each machine axis. Another technique may include adjusting the length of each motion along each axis to account for the CTE along that axis. Yet another technique may include generating a CNC program to run in the background that modifies the program motions to account for the CTE variation along each machine axis. One of skill in the art will understand that the above list of compensation techniques is exemplary only and is not exhaustive. Additionally, in some embodiments, a combination of techniques may be used. Once a technique is determined, the new tool path would then be used to trim the part a second time while the part is at room temperature.

Figure 7:
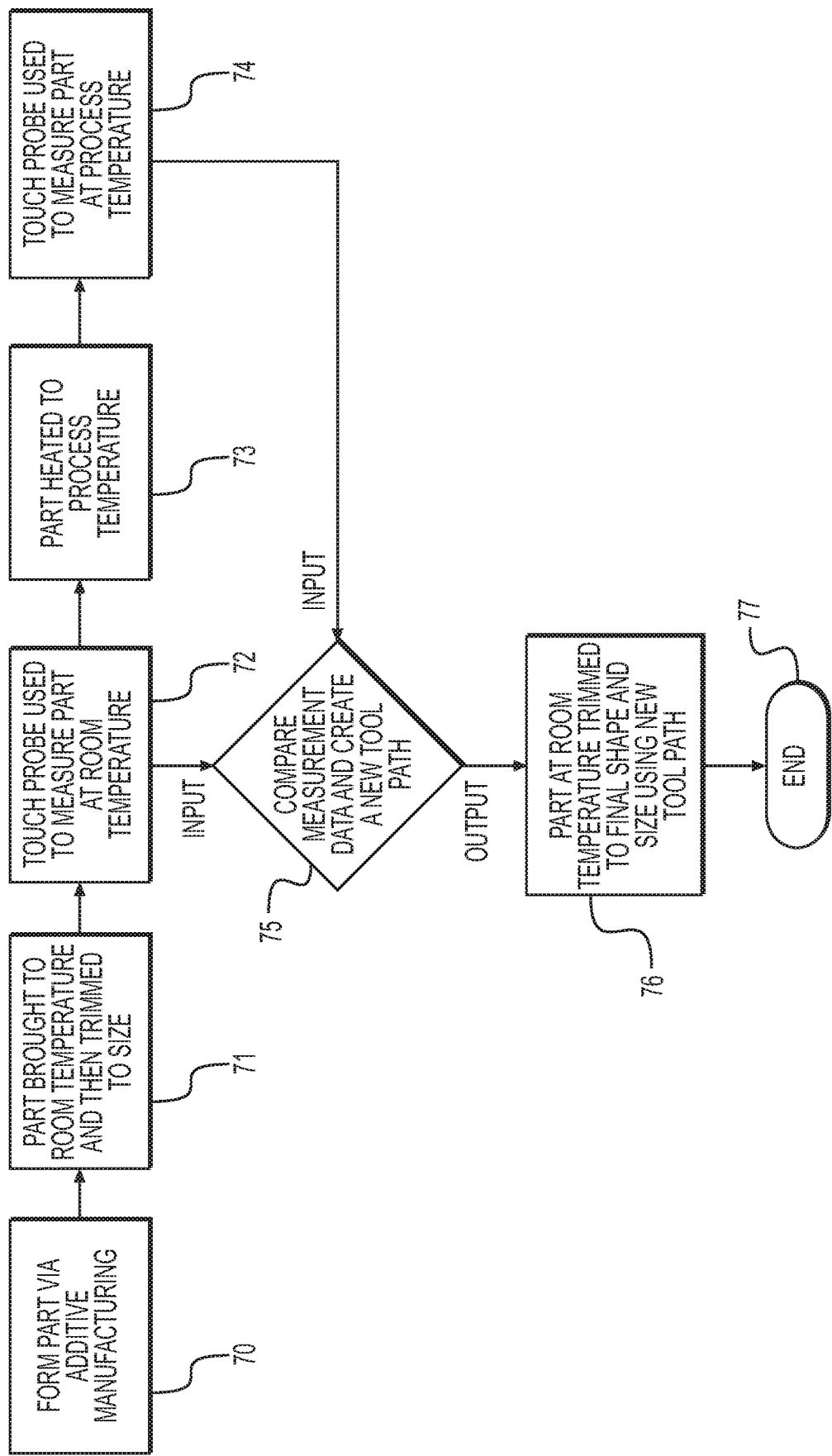
FIG. 7 is a flowchart depicting steps of an exemplary method, according to an aspect of the present disclosure.

FIG. 7 depicts an exemplary method of using a touch probe to generate a new tool-path program to compensate for CTE. The exemplary method begins at a starting step 70, during which an initial part 55 (e.g., thermoplastic tool or mold) may be formed via additive manufacturing. Part 55 may be printed using printing gantry 23 of the CNC machine 1, as described above. The exemplary method may utilize a tool-path program used for additive manufacturing using suitable software, for example, CAD software, to manufacture part 55. In some embodiments, part 55 may be printed at room temperature.

Once part 55 is printed, at a step 71, part 55 may be cooled or otherwise brought to room temperature, if it is not already at room temperature, and trimmed using trimming gantry 36 to create a trimmed printed part 57. At a step 72, trimmed part 57 may be probed with an appropriate surface probing technology (e.g., probe 67) at room temperature to measure trimmed part 57 along a plurality of axes. The measurement data may be transmitted from probe 67 to a control (not illustrated) for storage. At a next step 73, trimmed part 57 may then be heated (e.g., using an oven, one or more heat lamps or heaters, or other suitable heating device) to bring part 57 up to a desired process temperature. Heating of trimmed part 57 may occur in place on CNC machine 1, or trimmed part 57 may be moved for heating.

A process temperature is the temperature at which part 57, e.g., a 3D printed tool or mold, would normally operate at or near during use. For example, a 3D printed tool may heat up when it is being used and, as a result, may expand during use. The process temperature may vary depending upon the size of the part, shape of the part, type of thermoplastic material used in making the part, intended use of the part, and/or any other properties that may affect thermal expansion of the part. An exemplary process temperature may be 200 degrees to 450 degrees Fahrenheit.

In a next step 74, trimmed part 57 may be probed once more using probe 67, while part 57 is at the process temperature. Measurement data for the heated, trimmed part 57 may be transmitted from probe 67 to the control.

At a next step 75, the two sets of measurement data may be compared, and the comparison data may be used to create a new tool-path program. In some embodiments, the control may compare the sets of measurement data. The control of machine 1 may perform this function by subtracting the initial measurements at each measurement point taken when part 57 was at a cooler temperature from measurements taken at each measurement point when part 57 was then heated to a process temperature to determine the amount of expansion at each measurement point. This expansion amount may then be divided by the initial size measurement at each measurement point to calculate the expansion per unit of measure, for example, the expansion per inch. This expansion per unit of measure may then be divided by the number of units of temperature difference between the room temperature at which the initial measurements were taken and the elevated temperature at which the second set of measurements were taken to determine the CTE. This thermal expansion calculation may then be used to modify the original tool-path program to compensate for the eventual expansion of part 57 when brought to a process temperature during use.

At a step 76, the control of machine 1 may then implement the new tool-path program to further trim part 57 at room temperature. Trimming part 57 at step 76 may modify part 57 to compensate for CTE. For example, as a result of this second trimming, part 57 may assume the intended size and shape when heated to the intended process temperature. Later, when trimmed part 57 is heated to the intended process temperature during use, part 57 may assume the intended shape and/or size as it expands according to the calculated CTE.

Any steps of the process of FIG. 7 may be repeated one or more times until the intended shape and/or size of the printed part to compensate for CTE is achieved. The process may then end at step 77. While steps 70-76 are depicted in a particular order, the principles of the present disclosure are not limited to the specific order shown in FIG. 7.

Figure 8:
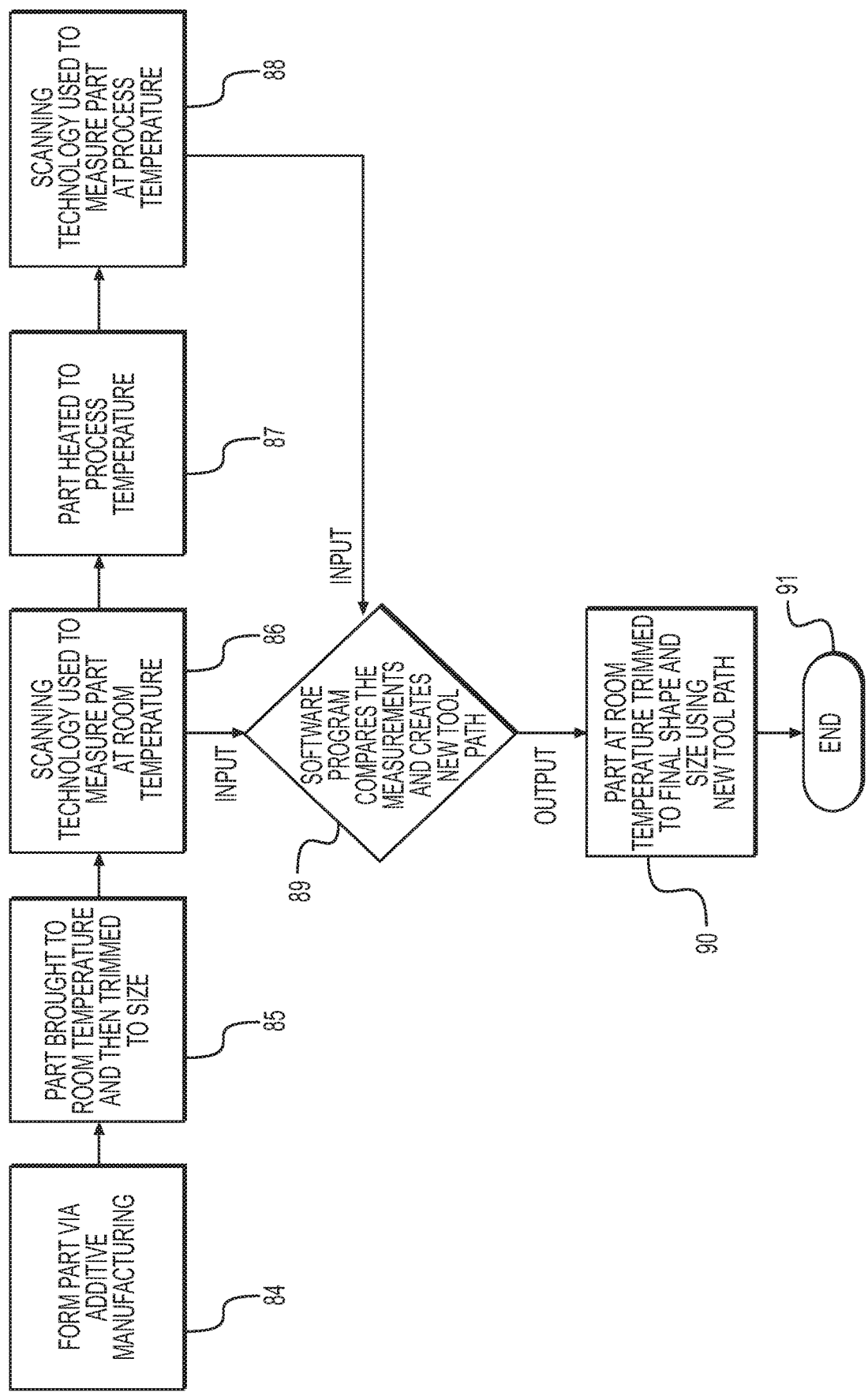
FIG. 8 is a flowchart depicting steps of an exemplary method, according to an aspect of the present disclosure.

FIG. 8 depicts an exemplary method of using a surface scanner to generate a new tool-path program to compensate for CTE. The exemplary method begins at starting step 84, during which an initial part 55 (e.g., a thermoplastic mold or tool) may be formed via additive manufacturing. Part 55 may be printed using printing gantry 23 of CNC machine 1, as described above. The exemplary method may utilize a tool-path program used for additive manufacturing using suitable software, for example, CAD software, to manufacture part 55 to the desired dimensions. In some aspects, part 55 may be printed at room temperature.

Once part 55 is printed, at a step 85, part 55 may be cooled or otherwise brought to room temperature, if it is not already at room temperature, and trimmed using trimming gantry 36 to create a trimmed printed part 57. At a next step 86, trimmed part 57 may be scanned with an appropriate 3D surface scanning technology (e.g., 3D surface scanner 68) at room temperature to measure trimmed part 57 along a plurality of axes. The measurement data may be then be transmitted from scanner 68 to a software program for storage, and a 3D rendition of part 57 at room temperature may be generated. Data from the computer software used to trim part 55 (e.g., CAD data) may also be sent to the software program for storage in addition to, or instead of, data from scanner 68. The software program may be uploaded onto control of machine 1.

At a next step 87, trimmed part 57 may then be heated (e.g., using an oven, one or more heat lamps or heaters, or other suitable heating device) to bring part 57 up to a desired process temperature. Heating of trimmed part 57 may occur in place on CNC machine 1, or trimmed part 57 may be moved for heating. In a next step 88, trimmed part 57 may be scanned once more using scanner 68, while part 57 is at the process temperature. Measurement data for the heated, trimmed part 57 may be transmitted from scanner 68 to the software program, which may be uploaded on the control of machine 1. In some aspects, a 3D rendition of part 57 at the process temperature may be generated.

At a next step 89, the two sets of measurement data and/or 3D renditions may be compared, and the comparison may be used to generate a new tool-path program. In some examples, the software program, and/or the control of machine 1, may perform this function by subtracting the initial measurements at each measurement point taken when part 57 was at a cooler temperature from measurements taken at each measurement point when part 57 was then heated to a process temperature to determine the amount of expansion at each measurement point. This expansion amount may then be divided by the initial size measurement at each measurement point to calculate the expansion per unit of measure, for example, the expansion per inch. This expansion per unit of measure may then be divided by the number of units of temperature difference between the room temperature at which the initial measurements were taken and the elevated temperature at which the second set of measurements were taken to calculate CTE. This thermal expansion calculation may then be used to modify the original tool-path program to compensate for the eventual expansion of part 57 when brought to a process temperature during use.

At a step 90, the control of machine 1 may then implement the new tool-path program to further trim part 57 while at room temperature. Trimming part 57 at step 90 may modify part 57 to compensate for the CTE. For example, as a result of the second trimming, part 57 may assume the intended size and shape when heated to the intended process temperature. Later, when part 57 is heated to the intended process temperature during use, part 57 may assume the intended shape and/or size as it expands according to the calculated CTE.

Any steps of the process of FIG. 8 may be repeated one or more times until the intended shape and/or size of the printed part to compensate for CTE is achieved. The process may then end at step 91. While steps 84-90 are depicted in a particular order, the principles of the present disclosure are not limited to the specific order shown in FIG. 8.

The CNC control may comprise one or more processors, one or more memory storages, and/or one or more servers to achieve the aforementioned steps in either FIG. 7 or 8.

From the foregoing detailed description, it will be evident that there are a number of changes, adaptations, and modifications of the present invention that may come within the province of those persons having ordinary skill in the art to which the aforementioned disclosure pertains. However, it is intended that all such variations not departing from the spirit of the invention be considered as within the scope thereof.

What is claimed is:

1. An additive manufacturing method, comprising:
measuring a first size of a first part at a first temperature;
bringing the first part to a second temperature, different than the first temperature;
measuring a second size of the first part at the second temperature;
comparing the first size to the second size to calculate a coefficient of thermal expansion;
generating a tool path that compensates for the coefficient of thermal expansion to create a second part; and
wherein, when the second part is brought to the second temperature, the second part is substantially the same size as the first part at the first temperature.

2. The additive manufacturing method of claim 1, wherein the second temperature is a process temperature that the second part will be heated to during use.

3. The additive manufacturing method of claim 1, wherein the second temperature is higher than the first temperature.

4. The additive manufacturing method of claim 3, wherein the first temperature is an ambient temperature.

5. The additive manufacturing method of claim 1, wherein measuring the first size of the first part and measuring the second size of the first part is performed using a touch probe.

6. The additive manufacturing method of claim 5, wherein the touch probe is attached to a moveable gantry.

7. The additive manufacturing method of claim 1, wherein measuring the first size of the first part and measuring the second size of the first part is performed using a scanner.

8. The additive manufacturing method of claim 7, wherein the scanner is attached to a moveable gantry.

9. The additive manufacturing method of claim 1, wherein the first part and the second part comprise a thermoplastic material.

10. The additive manufacturing method of claim 1, wherein comparing the first size to the second size and generating the tool path that compensates for the coefficient of thermal expansion are performed by a controller associated with an additive manufacturing apparatus.

11. An additive manufacturing method, comprising:
measuring a first size of a first part at an ambient temperature;
bringing the first part to an elevated temperature above the ambient temperature;
measuring a second size of the first part at the elevated temperature;
comparing the first size to the second size to calculate a thermal correction factor;
generating, based on the thermal correction factor, a tool path to create a second part; and
wherein, when the second part is brought to the elevated temperature, the second part is substantially the same size as the first part at the ambient temperature.

12. The additive manufacturing method of claim 11, wherein the second part is a tool or a mold and the elevated temperature is a process temperature that the second part will reach during use.

13. The additive manufacturing method of claim 11, wherein measuring the first size of the first part and measuring the second size of the first part include measuring the first part along at least two axes.

14. The additive manufacturing method of claim 11, wherein measuring the first size of the first part and measuring the second size of the first part is performed using a touch probe or a scanner.

15. The additive manufacturing method of claim 14, wherein the touch probe or the scanner is attached to a moveable gantry.

16. The additive manufacturing method of claim 15, wherein the second part is created by a nozzle attached to the moveable gantry.

17. The additive manufacturing method of claim 16, wherein the moveable gantry is configured to extend above a support surface on which the first part is measured and the second part is created.

18. An additive manufacturing system, the system comprising:
a nozzle configured to extrude a thermoplastic material;
a memory storing instructions; and
a controller executing the instructions to perform a process including:
measuring a first size of a first part at a first temperature;
bringing the first part to a second temperature, higher than the first temperature;
measuring a second size of the first part at the second temperature;
comparing the first size to the second size to calculate a coefficient of thermal expansion;
generating a tool path that compensates for the coefficient of thermal expansion to create a second part;
directing the nozzle along the tool path; and
wherein, when the second part is brought to the second temperature, the second part is the same size as the first part at the first temperature.

19. The additive manufacturing system of claim 18, further comprising:
a support surface;
a moveable gantry configured to extend above the support surface; and
wherein the nozzle is attached to the moveable gantry.

20. The additive manufacturing system of claim 19, further comprising:
a measurement device comprising a touch probe or a scanner;
wherein measuring the first size of the first part and measuring the second size of the first part is performed using the measurement device; and
wherein the measurement device is attached to the moveable gantry.

* * * * *